United States Patent [19]
Smith

[11] Patent Number: 5,680,937
[45] Date of Patent: Oct. 28, 1997

[54] DEVICE FOR SUPPORTING COMPACT DISC CASES AND OTHER OBJECTS; SUPPORTING DEVICE WITH OBJECTS SUPPORTED THEREON

[75] Inventor: James Andrew Smith, Woodstock, Ga.

[73] Assignee: William H. Palmer, Roswell, Ga.; a part interest

[21] Appl. No.: 696,740

[22] Filed: Aug. 14, 1996

[51] Int. Cl.[6] ............................................. A47F 7/00
[52] U.S. Cl. ........................................................ 211/40
[58] Field of Search ................................. 211/40, 41, 163, 211/73; 206/309; D6/407

[56] References Cited

U.S. PATENT DOCUMENTS

| | | |
|---|---|---|
| D. 328,674 | 8/1992 | Dokoupil et al. . |
| D. 329,548 | 9/1992 | Wells et al. . |
| D. 342,395 | 12/1993 | Huang . |
| D. 343,533 | 1/1994 | David . |
| D. 351,528 | 10/1994 | Dardashti . |
| D. 352,415 | 11/1994 | Koziol . |
| D. 352,848 | 11/1994 | Dardashti . |
| D. 356,698 | 3/1995 | Chow . |
| D. 357,331 | 4/1995 | Yeh . |
| D. 359,647 | 6/1995 | Dardashti . |
| D. 360,097 | 7/1995 | Chu . |
| D. 360,799 | 8/1995 | Rocco et al. . |
| D. 361,012 | 8/1995 | Dardashti . |
| D. 361,465 | 8/1995 | Dardashti . |
| D. 365,488 | 12/1995 | Dardashti . |
| D. 369,266 | 4/1996 | Dardashti . |
| 5,188,240 | 2/1993 | Marino et al. . |
| 5,195,642 | 3/1993 | Dardashti . |
| 5,301,819 | 4/1994 | Moeken . |
| 5,314,077 | 5/1994 | Theosabrata . |
| 5,341,943 | 8/1994 | Fraser . |
| 5,370,242 | 12/1994 | Huang . |
| 5,542,550 | 8/1996 | Kakavoulis-Perera et al. .......... 211/40 |
| 5,607,065 | 3/1997 | Todd ........................................ 211/40 |

*Primary Examiner*—Alvin C. Chin-Shue
*Assistant Examiner*—Sarah L. Purol
*Attorney, Agent, or Firm*—Beveridge, DeGrandi, Weilacher & Young, L.L.P.

[57] ABSTRACT

Horizontal facing slots for receiving CD cases or other objects are formed in a rotatable vertical post. The slots face radially outwardly and they are arranged in vertical columns. At each elevation, there is a pair of diametrically opposed slots. The slots of each pair are at a same elevation, and the slots in four consecutive pairs are all in different vertical columns. Preferably, there are eight columns and they are offset from each other by horizontal angles of 45°.

22 Claims, 3 Drawing Sheets

DEVICE FOR SUPPORTING COMPACT DISC CASES AND OTHER OBJECTS; SUPPORTING DEVICE WITH OBJECTS SUPPORTED THEREON

BACKGROUND OF THE INVENTION

This invention relates to a device for supporting compact disc cases and other objects, and, in another respect, it involves such a device in combination with objects supported. thereon.

There is a vast amount of patent literature which discloses various devices for supporting compact disc cases ("CD cases"). Many are vertically-elongated devices which support vertical columns of horizontal CD cases. Some devices have two such columns in back-to-back relationship, and others have more than two columns. In some devices, the CD cases are received by and supported in slots which extend radially and generally horizontally from a post-like member.

The present invention, although bearing some similarities to prior devices of this type, has particular practical and aesthetic advantages. From a practical standpoint, it is convenient to read the titles on the outward edges of the CD cases, and the spacings between vertically adjacent discs in any column are such that it is convenient to grasp a case between the finger and thumb, rather than to engage only the side edges of the CD case to remove it from its respective slots. These spacings also make it possible to see a large triangular area of the upper surface of each of the CD cases or other objects supported in the device. Aesthetically, the device, when filled with CD cases, presents a generally polygonal arrangement, preferably octagonal because of the use of eight columns has been found to position the outer corners of one column adjacent to the outer columns of the CD cases in the adjacent columns. Even when the device is not filled, its appearance is quite attractive and will enhance the decor of any room.

SUMMARY OF THE INVENTION

According to the invention, a device for supporting and displaying compact disc cases and other objects includes a post which is provided with a plurality of slots which face radially outwardly from the post. Each slot has a central axis which extends radially from the post and an interior abutment for positioning an interior edge of an object which is placed in the slot. The slots are arranged in at least five vertical columns. Each column includes a plurality of slots which have their central axes on a common vertical plane which includes the vertical central axis of the post. The vertical planes of the columns are offset from each other by a horizontal angle of 360°/n where n is the number of columns.

Preferably, the device has a nonrotating base. The post is rotatable about its central axis, and it has an upper knob portion which extends at least one inch above the slots to facilitate manual rotation of the post. The slots are arranged in pairs and they are inclined upwardly and outwardly by an angle which is no more than 10° from horizontal. The slots in each pair are at a same elevation and are diametrically opposed to each other on opposite sides of the vertical axis of the post. The distance between the interior abutments of the slots in each pair is from about ½ inch to about 2 inches.

According to the preferred embodiment of the invention, the slots are arranged in eight columns; four vertically successive pairs of slots include eight slots which are in eight different columns; and, each of the vertically successive pairs of slots is offset by a horizontal angle of 45° from the pair of slots immediately therebelow. The vertical distance between adjacent slots in any column is at least 3 inches, and the adjacent columns are offset from each other by horizontal angles of 30° to 75°, so it is possible to see a large triangular area of the upper surface of each of the CD cases or other objects supported in the device. Each column has vertical spacings between its slots which are equal to the vertical spacings between the slots in the other columns.

When the device is loaded, it includes a group of CD cases or other objects which are arranged in columns, and the inner edge of each object contacts an interior abutment of a slot. The objects can be rectangular cases for compact discs. These cases have dimensions of about 5"×5.5"×0.4". Each of the objects has an outward portion which extends radially beyond the post, and two outer corners. Each of the objects in any one column has the following:

a first outer corner lying on a first vertical axis which is near a vertical axis which includes outer corners of the objects in a first adjacent column of objects; and a second outer corner lying on a second vertical axis which is near a vertical axis which includes outer corners of the objects in a second adjacent column of objects.

The invention also relates to the combination of a supporting device with a group of CD cases or other objects supported thereon. The supporting device includes a post which has a plurality of slots which face radially outwardly from the post. Each of the objects has an inward portion located in one of the slots and an outward portion which extends radially beyond the post. Each slot has an interior abutment which contacts an inner edge of the object which is located in the respective slot. The slots and the objects supported therein are arranged in at least five vertical columns, and each column is formed of a plurality of slots which have their radially extending central axes on a common vertical plane which includes the vertical axis of the post. The vertical planes of the columns are offset from each other by a horizontal angle one 360°/n where n is the number of columns.

Each of the objects in one column has (a) a first outer corner lying on a first vertical axis which is near a vertical axis which includes outer corners of the objects in a first adjacent column of objects, and (b) a second outer corner lying on a second vertical axis which is near a vertical axis which includes outer corners of the objects in a second adjacent column of objects.

In the combination which includes the device and the objects, there is preferably a nonrotating base. The post is rotatable about its central axis and it has an upper knob portion which extends at least one inch above the slots to facilitate manual rotation of the post. There are eight vertical columns of slots, and they are arranged in pairs so that the slots in each pair are at a same elevation and are diametrically opposed to each other on opposite sides of the vertical axis of the post. The distance between the interior abutments of the slots in each pair is from about ½ inch to about 2 inches. Four vertically successive pairs of slots include eight slots which are all in different columns, and each of the vertically successive pairs of slots is offset by a horizontal angle of 45° from the pair of slots immediately therebelow. Each column has vertical spacings between its slots which are equal to the vertical spacings between the slots in the other columns.

The invention may take many forms, only one of which is described below and shown in the accompanying drawings.

DESCRIPTION OF A PREFERRED EMBODIMENT

Figure 1:
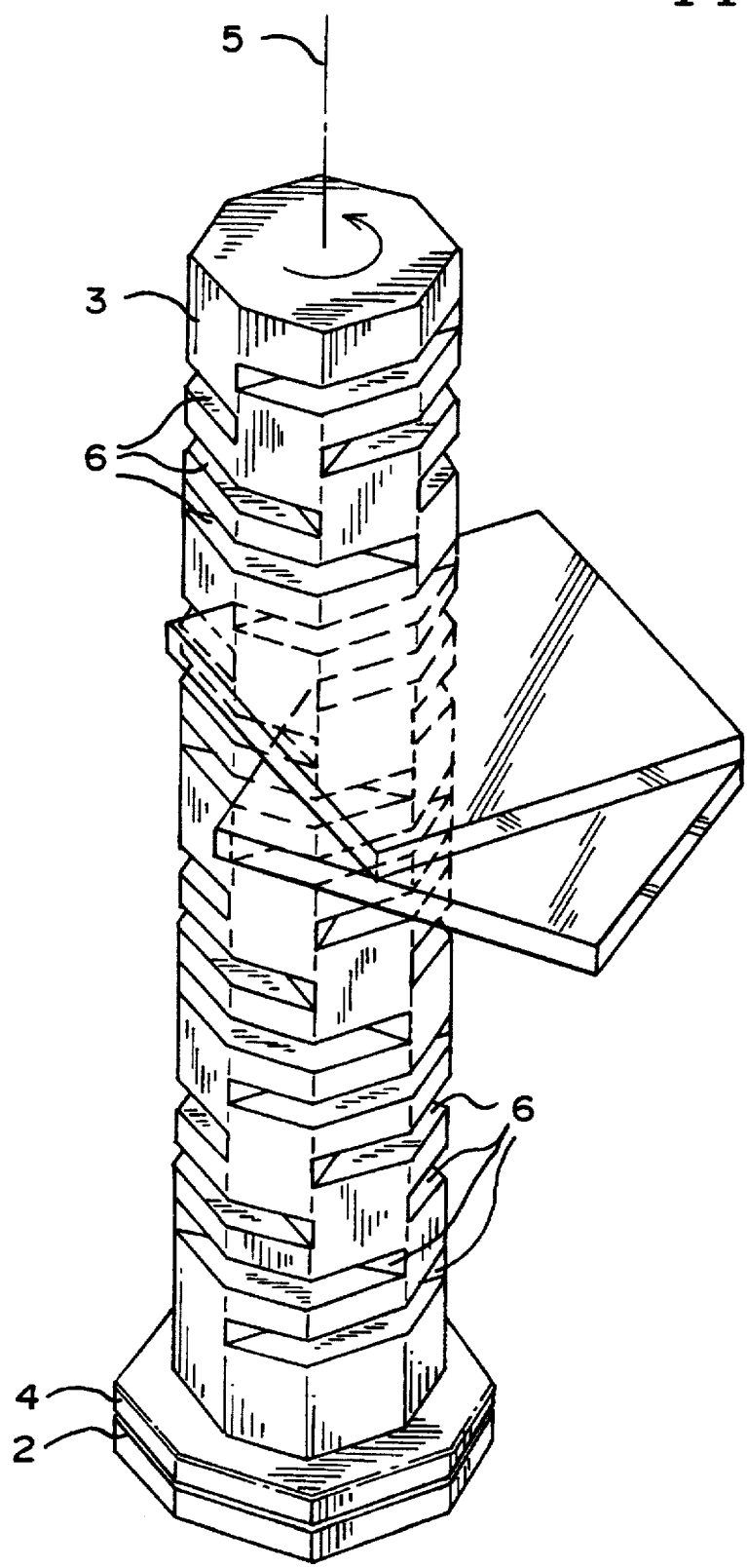
FIG. 1 is a perspective view of a device constructed according to the invention showing, by way of example, the positions of two CD cases supported therein.

As shown in FIG. 1, a preferred embodiment of the invention includes a nonrotating lower base 2 and a rotating assembly which includes a vertical post 3 rigidly mounted on a rotating base member 4. A bearing (not shown) supports the rotating assembly for rotation about an axis 5 which is the central vertical axis of the post 3. The post 3 and the members 2 and 4 are preferably formed of wood, but they can be made of plastic or other suitable materials.

The post 3 has an octagonal cross section, eight vertical faces, and a plurality of slots 6 for supporting compact disc cases ("CD cases") or other objects. The post extends at least about one inch above the slots to provide a manually-engagable knob portion which can be grasped and turned by a user to rotate the post.

Figure 2:
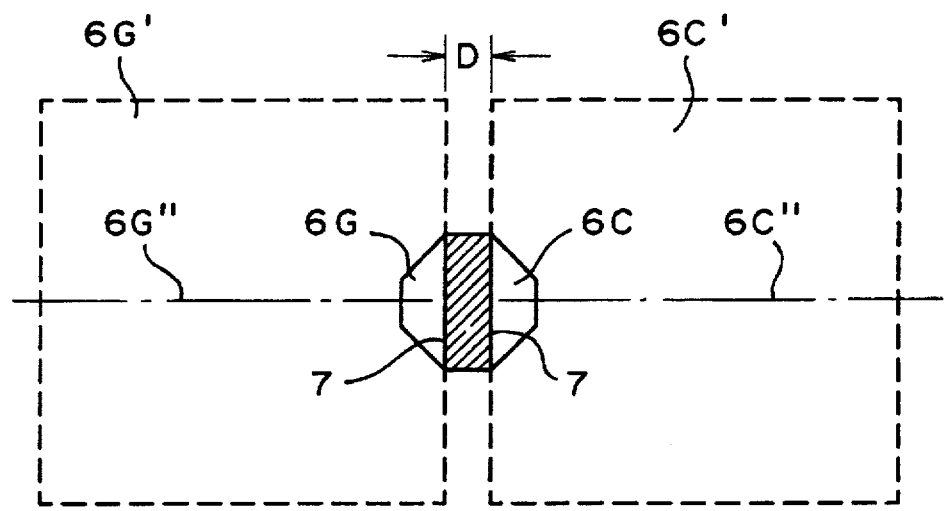
FIG. 2 is a sectional view of the device showing, in broken lines, two CD cases which are mounted in one pair of slots.
Figure 3:
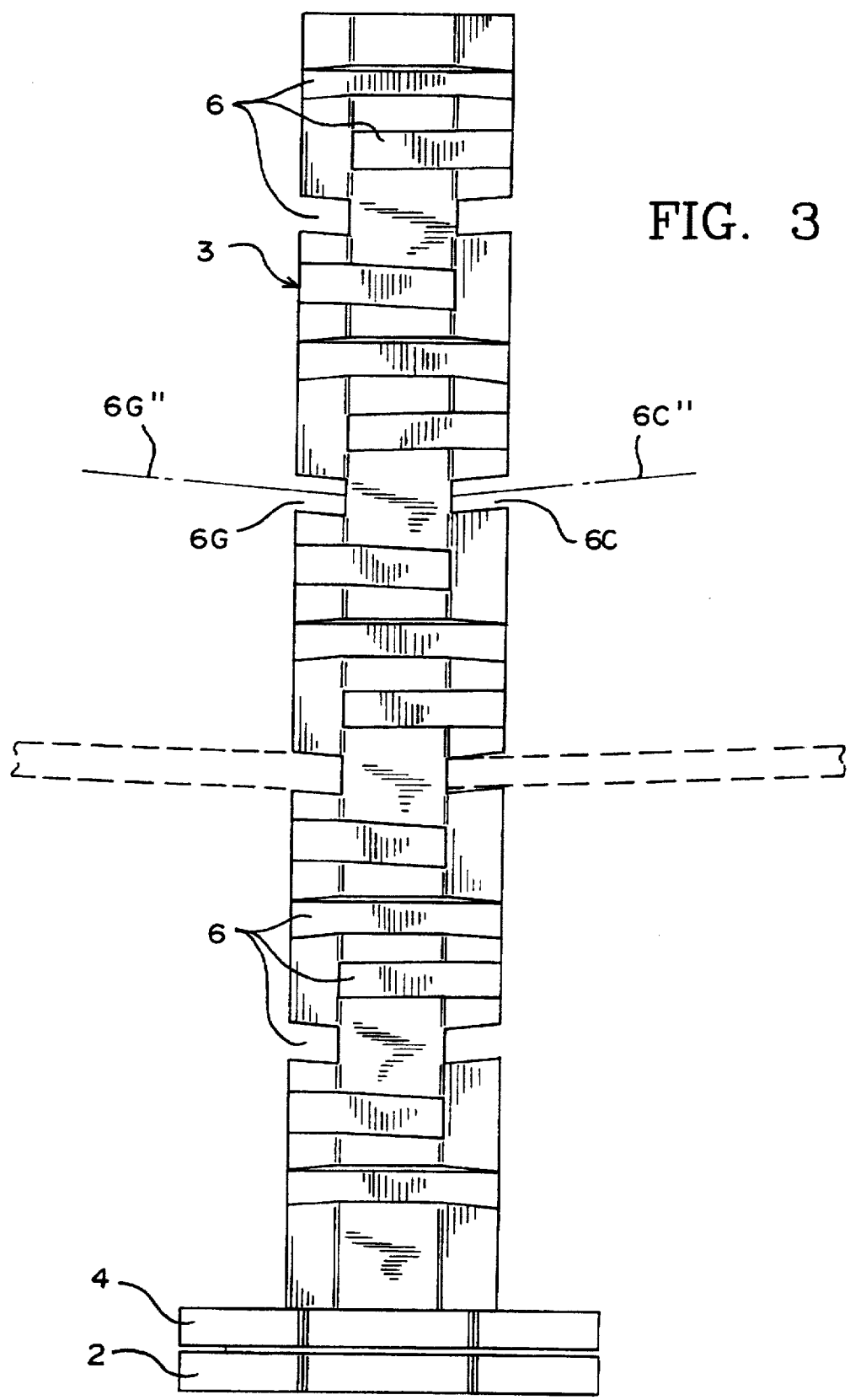
FIG. 3 is a side elevation of the device showing, in broken lines, two CD cases mounted in one pair of slots

The slots 6 are substantially horizontal. Preferably, as can be seen in FIG. 3, they are inclined upwardly and outwardly by an angle which is no more than 10° from horizontal. Angles up to 45° or greater are possible. As shown in FIG. 2, the slots have bottom surfaces 7 which act as interior abutments for positioning the interior edges of the CD cases which are placed therein. The horizontal distance D between these bottom surfaces 7 of each pair of slots in the device is from about ½ inch to about 2 inches.

Figure 4:
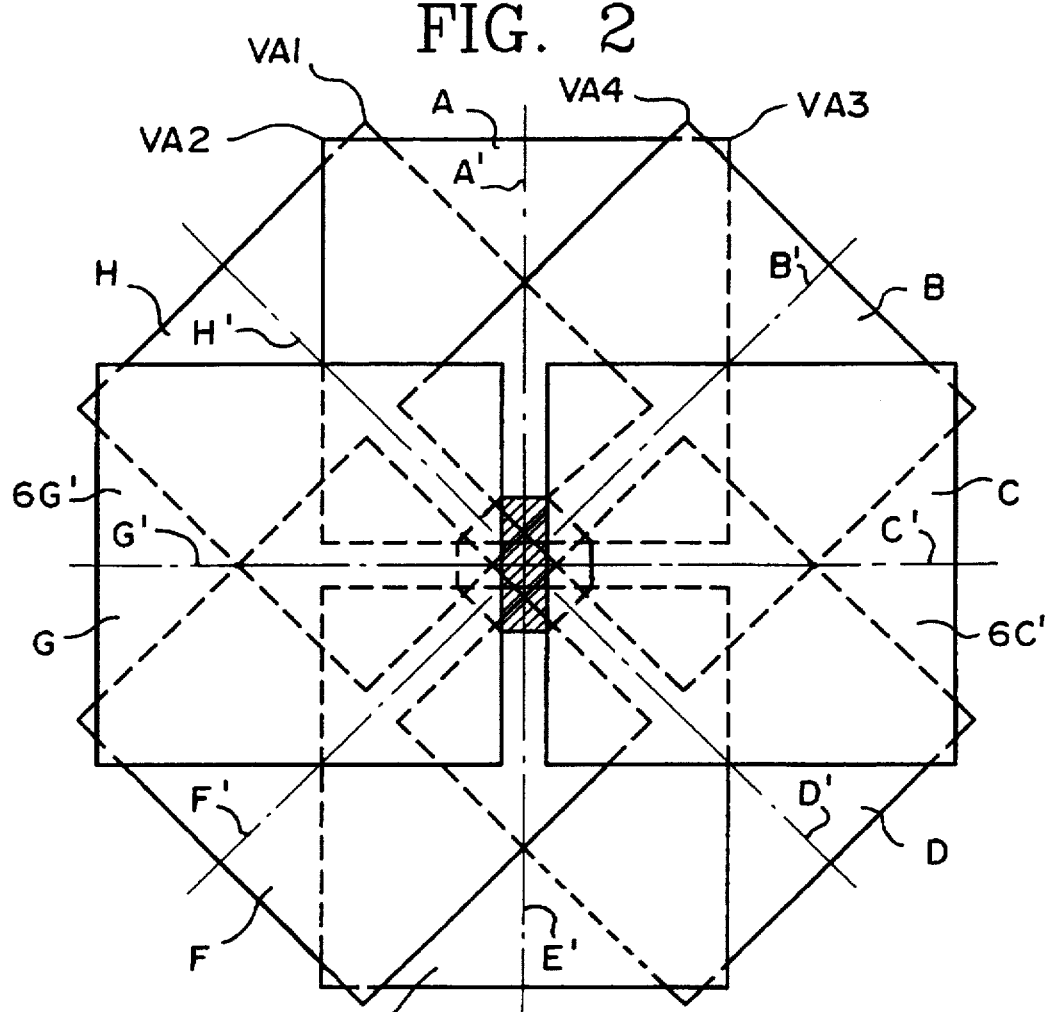
FIG. 4 is a downwardly looking sectional view showing the device and eight columns of CD cases mounted in their respective slots in the device.

There is a vertical column of slots in each face of the octagonal post so there are eight columns of slots which will support eight corresponding columns of CD cases. In FIG. 4, the columns of cases are identified by the reference letters A, B, C, D, E, F, G, and E. As shown in FIGS. 1 and 3, each column has vertical spacings between its slots which are equal to the vertical spacings between the slots in the other columns.

The post 3 in the illustrated embodiment has thirty-four slots 6 arranged in seventeen pairs. The slots of each pair are at the same elevation and they are diametrically opposed to each other. In the following description, the slots in each pair are identified by a common reference numeral and an alphabetical suffix which identifies the column in which it lies. A typical pair of slots 6C and 6G is shown in FIG. 2. These slots are at the same elevation. Slot 6C holds a CD case 6C' which is in column C and slot 6G holds a CD case 6G' which is in column G. These slots have central axes 6C" and 6G" (FIGS. 2 and 3) which lie in vertical planes C' and G' (FIG. 4). With respect to the post axis 5, planes C' and G' are displaced from each other by a horizontal angle of 180°. As shown in FIG. 2, measuring in a clockwise direction and using the vertical plane A' as a frame of reference, the plane C', the CD cases in column C, and the slots for these cases are at a 90° position. The axis G' and the slots and the CD cases centered on it are at a 270° position.

As can be seen from the drawings, any four vertically successive pairs of slots include eight slots which are in the eight different columns A, B, C, D, E, F, G, and H. The planes A', B', C', D', E', F', G', and H' and their columns are 45° apart, and each of the vertically successive pairs of slots is offset by 45° from the pair of slots immediately therebelow. In each column, the vertical distance between adjacent slots is at least 3 inches. This, coupled with the fact that adjacent columns are offset from each other by horizontal angles of 30° to 75°, makes it possible to see a large triangular area of the upper surface of each of the CD cases or other objects supported in the device.

An aesthetically and functionally desirable characteristic of the invention is that the CD cases in each column have their outer corners located near the outer corners of the CD cases in the adjacent columns. Thus, the outer edges of all of the CD cases on the post, when filled, occupy 360° of the periphery of the fully loaded device. This is best illustrated in FIG. 4 where it will be seen, for example, that each of the CD cases in column A has a first outer corner which lies on a vertical axis VA1 which extends through this corner. This axis is near the vertical axis VA2 which includes the outer corners of the CD cases in the adjacent column H. Each CD case in column A also has a second outer corner which lies on a vertical axis VA3 which is near the vertical axis VA4 which includes outer corners of the CD cases in the adjacent column B of CD cases.

While it is preferred to provide eight columns of slots for receiving eight columns of objects, and to space these respective columns apart by horizontal angles of 45°, fewer or more columns may be provided. At least five columns are required, and they are offset from each other by a horizontal angle of 360°/n where n is the number of columns.

This specification discloses a preferred embodiment of the invention, but it will be understood that the invention is not limited only to this embodiment. It is preferred to practice the invention with CD cases which are rectangular cases having dimensions of about 5 inches by 5.5 inches by 0.4 inch, but it may also be practiced with thicker cases which hold multiple compact discs, or with objects such as audio or video cassette cases which have different dimensions.

I claim:

1. A device for supporting and displaying compact disc cases and other objects comprising, a post which has a vertical central axis and is provided with a plurality of slots which face radially outwardly from the post, each of said slots having an interior abutment for positioning an interior edge of an object which is placed in said slot, each slot having a central axis which extends radially from said post, said slots being arranged in at least five vertical columns, each said column including a plurality of slots which have their central axes on a common vertical plane which includes the vertical central axis of said post, said vertical planes of said columns being offset from each other by a horizontal angle of 360°/n where n is the number of columns.

2. A device according to claim 1 wherein there are eight vertical columns.

3. A device according to claim 1 wherein the slots are inclined upwardly and outwardly by an angle which is no more than 10° from horizontal.

4. A device according to claim 1 wherein said slots are arranged in pairs, said slots in each pair being at a same elevation and being diametrically opposed to each other on opposite sides of the vertical central axis of the post.

5. A device according to claim 4 wherein the distance between the interior abutments of the slots in each pair is from about ½ inch to about 2 inches.

6. A device according to claim 4 wherein four vertically successive pairs of slots include eight slots which are in eight different columns.

7. A device according to claim 6 wherein each of said vertically successive pairs of slots is offset by a horizontal angle of 45° from the pair of slots immediately therebelow.

8. A device according to claim 6 wherein each column has vertical spacings between its slots which are equal to the vertical spacings between the slots in the other columns.

9. A device according to claim 1 having a nonrotating base, said post being rotatable about said vertical central axis and having an upper knob portion which extends at least one inch above said slots to facilitate manual rotation of the post.

10. A device according to claim 1 including a group of objects which are arranged in columns and which each have an inner edge which contacts an interior abutment of a slot, each of said objects having an outward portion which extends radially beyond the post and has two outer corners, each of said objects in one column of objects having a first outer corner lying on a first vertical axis which is near a vertical axis which includes outer corners of the objects in a first adjacent column of objects, each of said objects in said one column of objects having a second outer corner lying on a second vertical axis which is near a vertical axis which includes outer corners of the objects in a second adjacent column of objects.

11. A device according to claim 10 wherein the objects are rectangular cases for compact discs, said cases having dimensions of about 5"×5.5"×0.4".

12. The combination of a supporting device and a group of objects supported thereon, comprising, a post which has a vertical central axis and is provided with a plurality of slots which face radially outwardly from the post, each of said objects having an inward portion located in one of said slots, each of said slots having an interior abutment which contacts an inner edge of the object which is located in said slot, each slot having a central axis which extends radially from said post, said slots and the objects supported therein being arranged in at least five vertical columns, each said column including a plurality of slots which have their central axes on a common vertical plane which includes the vertical central axis of said post, said vertical planes of said columns being offset from each other by a horizontal angle of 360°/n where n is the number of columns, each of said objects having an outward portion which extends radially beyond the post and has two outer corners, each of said objects in one column of objects having a first outer corner lying on a first vertical axis which is near a vertical axis which includes outer corners of the objects in a first adjacent column of objects, each of said objects in said one column of objects having a second outer corner lying on a second vertical axis which is near a vertical axis which includes outer corners of the objects in a second adjacent column of objects.

13. The combination according to claim 12 wherein there are eight vertical columns of slots.

14. The combination according to claim 11 wherein said slots are arranged in pairs, said slots in each pair being at a same elevation and being diametrically opposed to each other on opposite sides of the vertical axis of the post.

15. The combination according to claim 14 wherein the distance between the interior abutments of the slots in each pair is from about ½ inch to about 2 inches.

16. The combination according to claim 14 wherein four vertically successive pairs of slots include eight slots which are all in different columns.

17. The combination according to claim 16 wherein each of said vertically successive pairs of slots is offset by a horizontal angle of 45° from the pair of slots immediately therebelow.

18. The combination according to claim 16 wherein each column has vertical spacings between its slots which are equal to the vertical spacings between the slots in the other columns.

19. The combination according to claim 16 having a nonrotating base, said post being rotatable about said vertical central axis and having an upper knob portion which extends at least one inch above said slots to facilitate manual rotation of the post.

20. The combination of a supporting device and a group of objects supported thereon, comprising, a nonrotating base, a post which is mounted on said base, said post having a vertical central axis and being provided with a plurality of slots which face radially outwardly from the post, said post being rotatable about its vertical central axis and having an upper knob portion which extends at least one inch above said slots to facilitate manual rotation of the post, each of said objects having an inward portion located in one of said slots, each of said slots having an interior abutment which contacts an inner edge of the object which is located in said slot, each slot having a central axis which extends radially from said post, said slots and the objects supported therein being arranged in eight vertical columns, each said column including a plurality of slots which have their central axes on a common vertical plane which includes the vertical central axis of said post, said slots being arranged with four vertically successive pairs of slots including eight slots which are in eight different columns, and each of said vertically successive pairs of slots is offset by a horizontal angle of 45° from the pair of slots immediately therebelow, each slot being inclined upwardly and outwardly by an angle which is no more than 10° from horizontal, said slots being arranged in pairs, said slots in each pair being at a same elevation and being diametrically opposed to each other on opposite sides of the vertical central axis of the post, said slots in each pair having their interior abutments spaced apart by a distance of about ½ inch to about 2 inches, said vertical planes of said columns being offset from each other by a horizontal angle of 45°, each of said objects being a compact disc case having dimensions of about 5"×5.5"×0.5", each of said objects having an outward portion which extends radially beyond the post and has two outer corners, each of said objects in one column of objects having a first outer corner lying on a first vertical axis which is near a vertical axis which includes outer corners of the objects in a first adjacent column of objects, each of said objects in said one column of objects having a second outer corner lying on a second vertical axis which is near a vertical axis which includes outer corners of the objects in a second adjacent column of objects.

21. A device according to claim 1 wherein the vertical distance between adjacent slots in any column is at least 3 inches, and adjacent columns are offset from each other by horizontal angles of 30° to 75°.

22. The combination according to claim 12 wherein the vertical distance between adjacent slots in any column is at least 3 inches, and adjacent columns are offset from each other by horizontal angles of 30° to 75°.

* * * * *